(No Model.) 2 Sheets—Sheet 1.

W. W. NEWCOMB.
MEASURING FAUCET.

No. 576,685. Patented Feb. 9, 1897.

Inventor
William W. Newcomb

Witnesses
H. T. Dieterich
V. B. Hillyard.

By his Attorneys,
C. A. Snow & Co.

(No Model.) 2 Sheets—Sheet 2.
W. W. NEWCOMB.
MEASURING FAUCET.
No. 576,685. Patented Feb. 9, 1897.
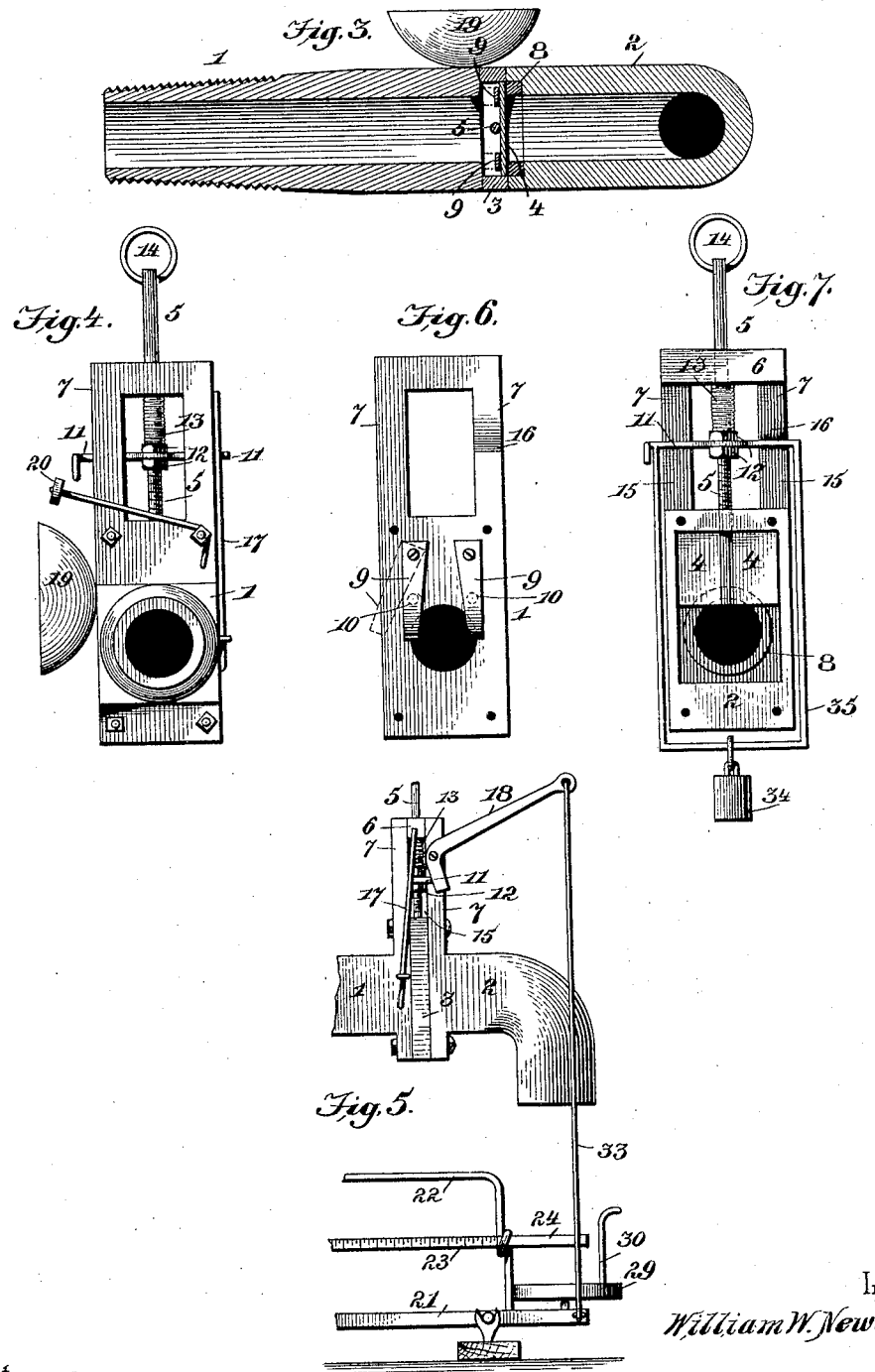
Witnesses
H. G. Dieterich
V. B. Hillyard
Inventor
William W. Newcomb
By his Attorneys,
C. A. Snow & Co.

UNITED STATES PATENT OFFICE.

WILLIAM W. NEWCOMB, OF BRADFORDSVILLE, KENTUCKY, ASSIGNOR OF ONE-HALF TO JOHN J. COZATT, OF SAME PLACE.

MEASURING-FAUCET.

SPECIFICATION forming part of Letters Patent No. 576,685, dated February 9, 1897.

Application filed May 26, 1896. Serial No. 593,162. (No model.)

*To all whom it may concern:*

Be it known that I, WILLIAM W. NEWCOMB, a citizen of the United States, residing at Bradfordsville, in the county of Marion and State of Kentucky, have invented a new and useful Measuring-Faucet, of which the following is a specification.

This invention relates to faucets for determining the amount of fluid to be drawn from a cask, barrel, or vessel at one operation and automatically shutting off the flow after the required quantity has been delivered into the receptacle provided for its reception.

In its construction the invention embodies a faucet having a gate or cut-off, means for automatically closing the gate when released, an audible signal to give warning when the gate is closed, a stop for holding the gate open during the interval of drawing off the liquid, a trigger for releasing the gate or cut-off the instant the amount of liquid is drawn, and a scale having a balancing-beam and a scale-beam and operatively connected with the aforesaid trigger to actuate it to release the gate or cut-off from the stop, whereby the flow of liquid is stopped when the required amount is obtained.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
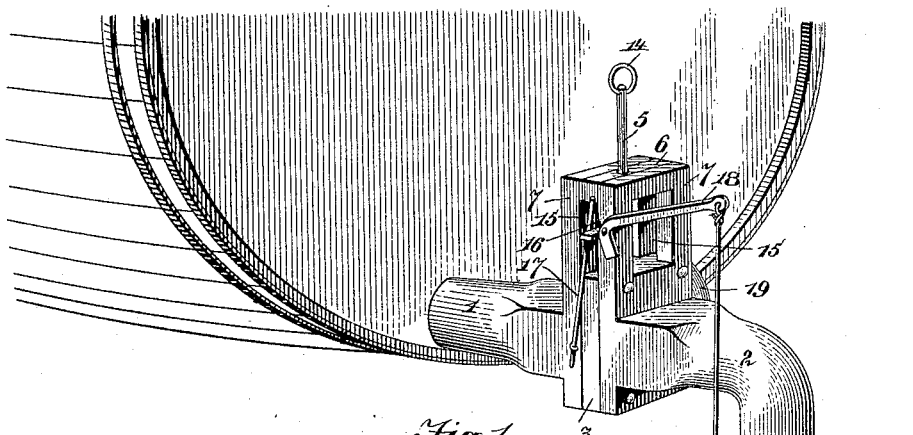
Figure 2:
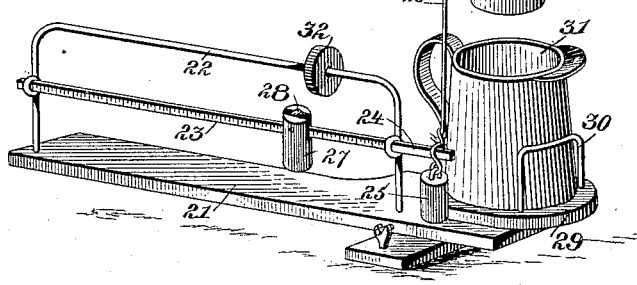
Figure 2:
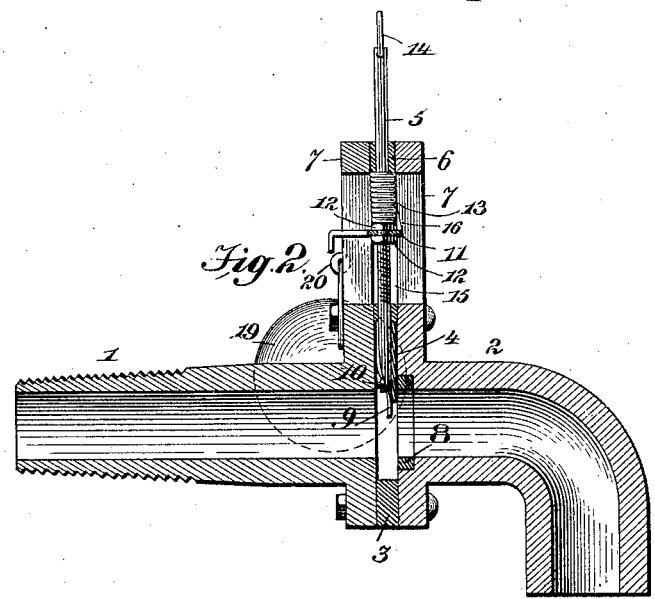

Figure 1 is a perspective view showing the invention in operative relation. Fig. 2 is a vertical longitudinal section of the faucet. Fig. 3 is a horizontal section thereof. Fig. 4 is a detail view showing the means for operating the audible signal. Fig. 5 shows a different manner of connecting the trigger with the scale. Fig. 6 is an end view of the inner part of the faucet, showing the springs for holding the gate against the washer seated in the outer part, the dotted lines showing one of the springs turned aside to admit of access to the tension-screw. Fig. 7 is an end view of the outer part, showing a weight for closing the gate.

Corresponding and like parts are referred to in the following description and indicated in the several views of the accompanying drawings by the same reference-characters.

The faucet is composed of two parts 1 and 2, the inner part 1 being adapted to be fitted into the bung-hole of a cask, barrel, tank, &c., containing the fluid to be drawn off, and the outer part 2 having the discharge-nozzle for giving proper direction to the fluid when drawing from the cask. These parts 1 and 2 are flanged at their inner or opposing ends, and these flanges are adapted to receive the bolts or fastenings by means of which the parts are secured together. A rib 3 is formed on one of the flanges, so as to provide a space between the flanges, in which operates the gate or cut-off 4. A stem 5 connects with the upper end of the gate or cut-off and operates through an opening in the upper portion of the flanges and works loosely through a cross-piece 6, connecting side pieces 7 at their upper ends, and which side pieces practically form prolongations of the flanges. A washer 8, of leather, rubber, or like material generally resorted to for securing a tight joint in devices of this character, is seated in a recess provided in the part 2 and is adapted to bear against the gate or cut-off 4, so as to provide a tight joint and prevent the escape of fluid. Springs 9 are fitted in the recess between the parts and are adapted to bear against the gate or cut-off 4, so as to hold it close against the washer 8, and set-screws 10 are provided to exert a pressure upon the springs 9 to regulate their tension, so as to cause them to bear against the cut-off or gate with a greater or less force, as may be required to maintain a tight joint and regulate the ease with which the gate or cut-off can be moved.

A cross-bar 11 is mounted upon the stem 5 and is adjustable thereon, being confined between a pair of jam-nuts 12, the said stem being threaded to receive the said jam-nuts. A spring 13 is mounted upon the stem 5, and is confined between the upper jam-nut or cross-bar and the cross-piece 6, and serves to hold the gate closed and operate the same when released. The upper end of the stem 5 is formed with a suitable handle for opening the gate when required, and this handle may be in the shape of a cross-bar or ring, the latter being shown, and this ring 14 is adapted to receive a finger of the hand when it is required to pull upon the stem to open the faucet. Slots 15 are formed vertically in the side pieces 7 and are adapted to receive the end portions of the cross-bar 11, so as to guide the latter in its vertical movements. Notches 16 are provided to one side of the slots 15 and form stops or shoulders to receive the end portions of the cross-bar 11, so as to maintain the gate or cut-off in open relation. A spring 17 is secured to the body of the faucet at one end, and its free end is adapted to press laterally against a terminal of the cross-bar 11, so that when the latter is brought in register with the notches 16 the spring will cause the cross-bar to turn upon the stem 5 and engage with the said notches 16 and hold the gate or cut-off open. A trigger 18 is fulcrumed to a side piece 7, and its inner end is adapted to be projected across the adjacent notch 16, so as to release the cross-bar 11 at the proper instant to permit the gate or cut-off to automatically close.

In order that notice may be given that the required amount of liquid has been drawn, an audible signal is provided and attached to the faucet, the same consisting of a gong-bell 19 and a hammer 20, the latter being spring-actuated and normally held away from the gong-bell. An end portion of the cross-bar 11 is bent so as to project across the path of the hammer 20, and is adapted to operate the latter when the gate closes, so as to cause the hammer to strike the gong and produce a warning sound and give notice that the faucet is closed and the required amount of liquid has been supplied.

A weighing mechanism or scale is used in connection with the faucet to operate the trigger the instant the requisite amount of liquid has been drawn, and this scale is conveniently located and consists of a lever or platform 21, fulcrumed near one end and provided with a balancing-beam 22 and a scale-beam 23. The scale-beam 23 is suitably graduated to indicate pounds and fractional parts thereof or to determine any desired quantity of liquid according to the nature of the latter. An end portion of the scale-beam 23 is extended, as shown at 24, to form a support for a weight 25, which has connection with the trigger 18 by means of a chain or cord 26. A weight 27 is slidably mounted on the scale-beam 23 to determine the quantity or weight of liquid to be drawn from the cask, and this weight is provided with a pulley 28, which is adapted to travel upon the top side of the beam 23 and support the weight 27. A rest 29 is provided at the shorter end of the lever or platform 21, and forms a seat for the receptacle which is designed to receive the liquid as the latter is drawn from the cask. A guard 30 is provided at the outer end of the rest 29, so as to retain the receptacle 31 in place when the lever or platform tilts. This rest 29 fixes the position of the receptacle and concentrates the weight, so as to insure accuracy in determining the quantity of liquid to be delivered into the receptacle. A weight 32 is slidably mounted upon the beam 22, and is intended to counterbalance the receptacle provided to receive the fluid contents of the cask. Under normal conditions the lever or platform 21 occupies an approximately horizontal position and is disposed so that a receptacle 31, placed upon the rest 29, will come opposite the discharge end of the faucet, and the weight 27 being adjusted to the required position upon the scale-beam 23 and it being desired to draw off a quantity of liquid the gate or cut-off is opened and the weight 25 is engaged with or suspended from the extension 24, and when the proper quantity of fluid has been delivered into the receptacle the lever or platform 21 will tilt and the extension 24, assuming an inclination to the horizontal, will release the weight 25, and the latter, pulling upon the trigger 18, will release the cross-bar 11 from the notches 16, and the spring 13, previously compressed by the opening of the gate, will regain itself and automatically close the gate, thereby shutting off the flow of liquid.

As shown in Fig. 5, the weight 25 and chain 26 may be dispensed with, and a rod or wire 33 connects the shorter end of the lever or platform 21 with the trigger 18, so that the tilting of the lever 21 will produce a direct pull upon the trigger and operate the latter. In this arrangement the advantage of having the weight 27 slide upon the beam 23 is manifest, since the instant the lever or platform begins to tilt the counterbalancing-weight 27 will move toward the fulcrum or pivotal support of the lever 21, thereby permitting the mass of the fluid drawn to tip the lever 21 suddenly and effect a pull upon the trigger sufficient to release the cross-bar 11 and permit the closing of the gate or cut-off.

The spring 13 may be replaced by a weight 34, suspended from the lower cross-bar of a frame 35, secured to or forming a part of the cross-bar 11, as shown in Fig. 7.

Having thus described the invention, what is claimed as new is—

1. In a faucet, the combination of a self-closing gate or cut-off having a stem, a cross-bar secured to and movable with the said stem and adapted to be turned, having the stem as an axis, stops to engage with the end portions of the cross-bar upon opposite sides of the stem and hold the gate open, and a trigger to engage with the cross-bar and release it from the said stops, substantially as and for the purpose set forth.

2. In a faucet, the combination of a self-closing gate or cut-off having a stem, slotted side pieces forming guides and having notches, a cross-bar mounted upon and movable with the stem of the gate and operating in the said guides, and adapted to be turned having the stem as an axis to enter the said notches, and a trigger for releasing the cross-bar from the notches, substantially as and for the purpose set forth.

3. In combination, a faucet composed of two parts flanged at their opposing ends, said flanges being bolted together, a gate or cut-off operating in a space formed between the said flanges, a washer located to one side of the gate, and springs disposed to exert a pressure against the opposite side of the gate to force it against the washer, substantially as set forth for the purpose described.

4. In a faucet, the combination of a gate or cut-off, a washer disposed upon one side of the gate, springs placed upon the opposite side of the gate, and set-screws for varying the tension of the said springs to cause the latter to press with greater or less force against the gate, substantially as and for the purpose set forth.

5. In a faucet, the combination of a self-closing gate or cut-off, a cross-bar secured to and having connection with the stem of the gate and having a projecting portion, stops to engage with the end portions of and support the cross-bar when the gate is open, a trigger to release the cross-bar from the stops, and an audible signal having a hammer extending across the path of the projecting portion of the cross-bar to be struck thereby, substantially in the manner set forth for the purpose described.

6. In combination, a faucet having a self-closing gate or cut-off, means for holding the gate open when drawing off the contents of a cask, barrel, &c., through the faucet, a trigger for releasing the gate, a scale-beam operatively connected with the trigger for actuating the latter when a predetermined amount of liquid has been drawn, and a weight 27 slidingly mounted upon the scale-beam and constructed to shift toward the fulcrum of the scale-beam the instant the latter tilts, substantially as and for the purpose set forth.

In testimony that I claim the foregoing as my own I have hereto affixed my signature in the presence of two witnesses.

WILLIAM W. NEWCOMB.

Witnesses:
W. R. HOURIGAN,
W. F. HOEKER.